(12) United States Patent
Flaig (10) Patent No.: US 11,674,543 B2
(45) Date of Patent: Jun. 13, 2023

(54) THREADED ELEMENT AND CONNECTION THAT CAN BE ESTABLISHED BY MEANS OF SAME

(71) Applicant: Hartmut Flaig, Aldingen (DE)

(72) Inventor: Hartmut Flaig, Aldingen (DE)

( * ) Notice: Subject to any disclaimer, the term of this patent is extended or adjusted under 35 U.S.C. 154(b) by 405 days.

(21) Appl. No.: 16/956,155

(22) PCT Filed: Dec. 5, 2018

(86) PCT No.: PCT/EP2018/083603
§ 371 (c)(1),
(2) Date: Jun. 19, 2020

(87) PCT Pub. No.: WO2019/121006
PCT Pub. Date: Jun. 27, 2019

(65) Prior Publication Data
US 2020/0340518 A1    Oct. 29, 2020

(30) Foreign Application Priority Data

Dec. 21, 2017    (DE) ...................... 10 2017 131 005.3

(51) Int. Cl.
F16B 39/282      (2006.01)
(52) U.S. Cl.
CPC .................................. *F16B 39/282* (2013.01)
(58) Field of Classification Search
CPC .................................................... F16B 39/282
(Continued)

(56) References Cited

U.S. PATENT DOCUMENTS

| 752,628 A * | 2/1904 | Miner | F16B 39/282 |
| | | | 411/145 |
| 1,551,389 A * | 8/1925 | Hanson | F16B 39/282 |
| | | | 411/931 |

(Continued)

FOREIGN PATENT DOCUMENTS

| CN | 206468669 U | 9/2017 |
| DE | 1090468 B | 10/1960 |

(Continued)

OTHER PUBLICATIONS

International search report for patent application No. PCT/EP2018/083603 dated Apr. 11, 2019.

*Primary Examiner* — Gary W Estremsky
(74) *Attorney, Agent, or Firm* — Bachman & LaPointe, P.C.

(57) ABSTRACT

A threaded element (1) is designed as a cold extrusion part made of metal and has a longitudinal center axis (L). The threaded element has a thread (5) having a thread pitch angle. The threaded element (1) can be screwed to a threaded connection partner having a mating thread by rotation in a tightening circumferential direction (F) and can thereby be moved in an axial movement direction (T) oriented along the longitudinal center axis (L) onto a support portion (17) of the threaded connection partner or of a component separate therefrom. The threaded element (1) has a ring portion (8) for support on the support portion (17). An anchor (9) for interlocking anchoring in the support portion (17) to establish an interlocking connection is formed on the ring portion (8). The anchor has a plurality of forming portions (10), spaced apart in the tightening circumferential direction (F) and are preferably uniformly distributed in the circumferential direction and which each comprise a lower forming edge (11) extending in the axial movement direction (T). Ahead of each forming portion (10) in the tightening cir- (Continued)

cumferential direction (F), there is a recess (12) for receiving support portion material (18) deformed by means of the forming portion (10) in question.

19 Claims, 6 Drawing Sheets

(58) Field of Classification Search
USPC .......................................................... 411/187
See application file for complete search history.

(56) References Cited

U.S. PATENT DOCUMENTS

| | | | | |
|---|---|---|---|---|
| 2,112,464 | A * | 3/1938 | Jacobs | .................. B60J 3/0217 |
| | | | | 248/289.11 |
| 2,112,494 | A | 3/1938 | Olson | |
| 2,147,209 | A | 2/1939 | Olson | |
| 2,833,326 | A * | 5/1958 | Friedrich | .............. F16B 35/044 |
| | | | | 411/959 |
| 3,895,663 | A | 7/1975 | Bashline et al. | |
| 7,014,406 | B2 * | 3/2006 | Robertson | ............. F16B 35/065 |
| | | | | 411/181 |
| 8,807,896 | B2 * | 8/2014 | McKinlay | ............. F16B 39/282 |
| | | | | 411/533 |
| 9,695,860 | B2 * | 7/2017 | Pieciak, Jr. | ......... F16B 25/0042 |
| 2007/0104552 | A1 * | 5/2007 | Hewgill | ................ F16B 39/282 |
| | | | | 411/145 |
| 2014/0140786 | A1 * | 5/2014 | McKinlay | ............. F16B 41/002 |
| | | | | 411/147 |
| 2015/0285291 | A1 * | 10/2015 | Kopp | ....................... H01R 4/26 |
| | | | | 411/378 |
| 2016/0003287 | A1 * | 1/2016 | Andersson | ............ F16B 39/282 |
| | | | | 411/533 |
| 2016/0290384 | A1 * | 10/2016 | Michiwaki | ............ F16B 39/282 |
| 2019/0078603 | A1 * | 3/2019 | Truong | ................. F16B 25/106 |

FOREIGN PATENT DOCUMENTS

| | | |
|---|---|---|
| DE | 2822928 A1 | 11/1979 |
| DE | 8530936 U1 | 1/1986 |
| DE | 9105667 U1 | 7/1991 |
| DE | 202008001295 U1 | 3/2008 |
| DE | 202010007769 U1 | 8/2010 |
| RU | 2594866 C2 | 8/2016 |

* cited by examiner

THREADED ELEMENT AND CONNECTION THAT CAN BE ESTABLISHED BY MEANS OF SAME

BACKGROUND OF THE INVENTION

The invention relates to a threaded element, preferably realized as a cold extrusion part made of metal, in particular steel, which has an (imaginary) longitudinal center axis and which comprises a thread which has a thread pitch angle, wherein the threaded element can be screwed to a screw joint partner having a mating thread by rotation in a tightening circumferential direction and can thereby be displaced in an axial displacement direction (axially translational, i.e. linear displacement direction) oriented along the longitudinal center axis onto a support section of the screw joint partner or of a separate component disposed axially adjacent to the threaded element (wherein the component can preferably be clamped between the screw joint partner and the threaded element), and wherein the threaded element has an (axial) annular section for the (axial) support on the support section, and wherein anchoring means for the interlocking anchoring in the support section are realized on the annular section in order to establish an interlocking connection, wherein the anchoring means have several forming sections which are spaced apart in the tightening circumferential direction and which are preferably uniformly distributed in the circumferential direction, wherein each forming section comprises a (lower) forming edge extending in the axial direction and preferably in the radial direction, wherein a recess is disposed upstream of each forming section in the tightening circumferential direction in order to receive support section material formed by means of the respective forming section, wherein the recesses are limited by a wall on a circumferential side opposite to the corresponding forming section in the tightening circumferential direction, wherein the wall has or is composed of a first wall section realized as a ramp which ascends against the tightening circumferential direction upwards against the axial displacement direction, and wherein each recess is limited by a second wall section of the respective or corresponding forming section, preferably adjoining the forming edge and/or the first wall section, on the circumferential side opposite to the first wall section realized as a ramp against the tightening circumferential direction.

Furthermore, the invention relates to a connection which comprises such a threaded element.

In practice, it is difficult to avoid an unintended release of a head screw screwed to an internal thread component in a reliable manner. In order to address this problem, it is known to realize an additional fixation of the head screw to the internal thread component by means of specific adhesives which increase the release torque. Additionally, it is known to deform the external thread of a head screw in such a manner that an increased release torque is realized by the interaction with the internal thread of an internal thread element which is realized as a standard internal thread. Analogously, a corresponding problem exists with respect to nuts.

From DE 20 2008 001 295 U1, a head screw which has a ribbed profile realized on an annular shoulder is known. The ribs limit axial recesses which are disposed between the ribs. FIG. 2, which shows the profile from a perspective from the radial inside to the radial outside, shows that a flank which limits the recess in the tightening circumferential direction ascends at an angle of 60° in a direction which faces away from the tightening circumferential direction. If the known head screw is displaced in a release direction, i.e. rotated against the tightening circumferential direction, in order to release a connection which is established by the screw, the 60°-flank is lifted above any construction material which is formed into the recess—it is not probable that the braking or holding torque is sufficient.

U.S. Pat. No. 2,147,209 A discloses a nut which has a rib structure which is helically twisted and which is provided on the bottom side of the nut, the flanks of the ribs ascending steeply.

From DE 85 30 936 A, a head screw is known which has a rib structure on the annular shoulder of its screw head, the rib structure having recesses disposed between the ribs. The flanks which ascend against the tightening circumferential direction and which limit the recesses in the tightening circumferential direction have a pitch angle of approx. 80°. With respect to said screw, the abovementioned flank would be lifted above or turned past any construction material formed into the recesses if said screw was twisted—it is not probable that a significant holding or braking torque is available.

DE 28 22 928 A1 discloses a head screw whose flank located in the tightening circumferential direction ascends steeply, in the present case at an angle of approx. 90°, the forming section, i.e. the opposite flank against the tightening circumferential direction, ascending slowly.

SUMMARY OF THE INVENTION

Starting from the aforementioned state of the art, the object of the invention is to indicate a threaded element which ensures an unintended release of the threaded by providing a high holding or braking torque and which does not require the provision of a non-standard thread and/or a deformed thread and/or the securing of the resulting screw connection against an unintended release by means of a specific adhesive. Furthermore, the object is to indicate a connection which can be established by means of such a threaded element.

Concerning the threaded element, said object is attained by the features disclosed herein, i.e. concerning a generic threaded element, in particular a head screw or a nut, by the fact that the first wall sections realized as, in particular linear, ramps (each) opposite to the forming sections in the tightening circumferential direction each have a pitch angle in relation to an (imaginary) radial plane through which the longitudinal center axis passes in the perpendicular direction, the pitch angle being larger than the thread pitch angle of the thread by an angle between at least 0.5° and not more than 20°, preferably between at least 1° and not more than 15°, particularly preferably between at least 1.5° and not more than 10°, more preferably between at least 2° and not more than 8°, particularly preferably between at least 2° and not more than 5°, and that the second wall sections (which are, preferably directly, adjacent to the respective first wall sections of the respective recess against the tightening circumferential direction) each comprise a radius (which opens in the tightening circumferential direction and/or axially in the translational displacement direction) or are realized as (such a) radius.

Concerning the connection, the object is attained by the features disclosed herein.

Advantageous embodiments of the invention are also disclosed herein and in the dependent claims. All combinations of at least two features disclosed in the description, the claims and/or the figures constitute part of the scope of the invention.

The invention is based on the idea of assigning anchoring means to the threaded element which has a thread, preferably (but not mandatorily) realized as a standard or regular thread, in the area of an axial annular section which extends around the longitudinal center axis and which is realized by a (lower) annular shoulder or front side of the screw head if the head screw is realized or—if the threaded element is realized as a nut—by an axial front side of a nut body by means of which the threaded element is supported on a support section in the assembled state, the anchoring means being realized in such a manner that material (support section material) of the support section which supports the aforementioned annular section of the threaded element and which is disposed adjacent to the thread is formed in a plastic manner into the appropriate recesses on the bottom side in the annular section by means of said anchoring means by rotating the threaded element in a tightening circumferential direction, i.e. clockwise with respect to a threaded element which has a right-hand thread and the axial feed connected thereto along the longitudinal extension of the longitudinal center axis in the translational (linear) displacement direction (towards the support section in the axial direction) in order to establish an interlocking connection between the threaded element and the support section which is either realized by a screw joint partner or by a separate component disposed axially adjacent to the annular section and in order to increase the release torque or breakaway torque which is required in order to release the threaded element and which is required in order to form or shear the formed material when the threaded element is released. In other words, an interlocking connection (axial interlocking) is established between the threaded element or the recesses provided in its annular section and a support section which supports the annular section of the threaded element in the axial direction (when the interlocking connection is established), the interlocking connection being effective in the release circumferential direction and increasing the release torque or a breakaway torque, the anchoring means, preferably realized in a monolithic manner with the annular section, having a plurality of forming sections spaced apart in the circumferential direction and extending in the axial direction, each forming section being realized in such a manner that material of the support section is formed or displaced in the tightening circumferential direction by means of the forming sections due to the combined movement of the threaded element during the tightening in the tightening circumferential direction and in the axial direction (i.e. in the translational displacement direction), in fact axially (against the axial translational displacement direction) into the respective axial recess adjacent to the respective forming section in the tightening circumferential direction, a rotation movement of the threaded element against the tightening circumferential direction, i.e. in a releasing circumferential direction, thus becoming more difficult. It is important that the forming sections do not cut off or machine at least a part of the support section material from the remaining support section or element when the threaded element is tightened, but that a fixed, integral connection remains between the material displaced into the recesses or at least a part of the material and the remaining support material in order to increase the required release torque in a reliable manner.

The increased release torque or breakaway torque results from the fact that the formed support section material (not cut off or shorn) hits against or is supported by a respective wall which limits the respective recess on the circumferential side opposite to the respective forming section in the tightening circumferential direction when a force is applied to the threaded element in the releasing circumferential direction in order to rotate the threaded element against the tightening circumferential direction. In order to specify a high, defined breakaway torque and/or to allow for a release of the threaded element or an intended rotation of said threaded element against the tightening circumferential direction while overcoming the release torque or breakaway torque, the invention provides that the aforementioned wall (flank) which limits the respective recess opposite to the forming section in the tightening circumferential direction, at least one first wall section, preferably realizing a largest surface section of said wall or flank, is realized as an, in particular linear i.e. not curved, ramp and ascends axially upwards (i.e. against the axial translational displacement direction during the tightening) away from the support section towards the upper end of the threaded element which faces away from the support section against the tightening circumferential direction (preferably in a linear manner), in fact with a pitch which is larger than the thread pitch of the thread of the threaded element. The respective first wall section which is realized as a ramp and which ascends axially against the tightening circumferential direction away from the forming edges of the forming sections particularly preferably realizes the largest surface section of the wall or flank which limits the recess in the tightening circumferential direction, which means that the first wall section constitutes more than 50% of the surface of the respective entire flank or wall, preferably more than 60%, more preferably more than 70%, particularly preferably more than 80%, more preferably more than 90%, the aforementioned first wall section realized as a ramp particularly preferably constituting the respective entire wall or flank opposite to the respective forming section in the tightening circumferential direction.

An important feature is the aforementioned selection of the pitch angle of the respective, aforementioned flank or wall or of the respective, aforementioned first wall section of said flank or wall by which said flank or wall ascends axially against the tightening circumferential direction, i.e. upwards (i.e. against the translational displacement direction) or axially away from the forming edges of the forming sections. In the downward direction, an essential condition is that the pitch angle which is confined by the respective flank or the respective first wall section and an (imaginary) radial plane through which the longitudinal center axis of the threaded element passes in the perpendicular direction is larger, in fact by at least 0.5°, than the thread pitch angle of the thread of the threaded element in order to avoid a smooth or unintended release of the threaded element in a reliable manner. Apart from that, it is also essential that the size of the aforementioned pitch angle or of the flanks or of the first wall sections is not larger than the thread pitch angle plus 20°. In other words, the pitch angle of the first wall section or of the entire wall (flank) is larger than the thread pitch angle of the thread by an angle between at least 0.5° and not more than 20°, particularly preferably between at least 1° and not more than 15°, more preferably between at least 1.5° and not more than 10°, more preferably between at least 2° and not more than 8°, particularly preferably between at least 2° and not more than 5°. The fact that the pitch angle of the respective first wall section (or of the respective entire flank or wall) does not exceed the defined, respective maximum pitch angle value ensures that the formed support section material can contact the first wall section or the wall over a large area and it is avoided that during the release of the threaded element, i.e. during a rotation against the tightening circumferential direction, only a lower edge of the anchoring means structure, in particular rib structure, is supported by the formed support section material or lifted above the formed support section material inside the recess within the scope of the release of the threaded element without having to overcome a significant holding or release torque. It is also avoided that the respective aforementioned wall section or the respective flank/wall has to be rotated some way in the circumferential direction until it comes into contact with the support section material—i.e. clearance is removed from a connection which is established by means of the threaded element according to the invention, because due to the selection of the angle, the formed support section material can be supported by the respective, abovementioned first wall section and, at the same time, by the respective opposite second wall section of the corresponding (respective) forming section against the tightening circumferential direction; as will be explained below, said second wall section is realized as a radius or at least comprises a radius. With respect to the angle selection of the pitch of the respective aforementioned flank or of the respective, first aforementioned wall section this means that if a typical thread pitch angle is 3.17° in an exemplary manner, the pitch angle of the respective flank and/or of the respective first wall section shall not be smaller than 3.67° and shall not be larger than 23.17°, preferably not smaller than 4.17° and not larger than 18.17°, in a preferred manner not smaller than 4.67° and not larger than 13.17°, more preferably not smaller than 5.17° and not larger than 11.17°, more preferably not smaller than 5.17° and not larger than 8.17°.

An additional important feature of the invention is that the respective second wall section of the respective or corresponding forming section which is opposite to the respective first wall section against the tightening circumferential direction and which limits the recess is not realized in a linear manner, but comprises a radius and is particularly preferably realized as a radius in such a manner that a convex section of the recess is realized into which support section material can be displaced. From the perspective of the recess, the recess section which is limited by the radius is convex, i.e. creates a convex recess against the tightening circumferential direction and opens in the tightening circumferential direction and/or in the translational axial displacement direction from the perspective of the radius. In other words, the second wall sections have the form of a radius, i.e. are convex or curved, in particular contoured as a circle segment or have a corresponding contouring at least over a subsection. The radius extends between two points of the second wall sections spaced apart in the axial direction, in particular from the corresponding forming edge to the adjacent first wall section or to the lowest point of the corresponding recess in an axial manner against the displacement direction. The radius contour of the second wall sections preferably extends, in particularly linearly, in the radial direction over the entire radial extension of the corresponding recess, the fillet-like recess contour thus resulting on the respective recess side located opposite to the tightening circumferential direction. The invention recognizes the fact that due to the realization or contouring of the second wall sections in the form of a radius, the risk of shearing support section material is significantly reduced during the tightening of the threaded element by rotation in the tightening circumferential direction and that support section material contacts the second wall section in the form of a radius in an improved manner or in increased quantities, in particular upwards in the axial direction or away from the support section, particularly preferably into a transition between the respective first and the respective second wall section.

A threaded element realized in the manner described above does not only a ensure a high holding or release torque, prevents a clearance in an established connection and prevents a turning of the first wall sections located in the tightening circumferential direction and ascending against the tightening circumferential direction and axially against the translational displacement direction when the threaded element is released via a formed support section material, but the aforementioned threaded element can also be realized in a particularly simple manner within the scope of a cold extrusion process, said process being preferred with respect to a cost-efficient and precise production of the threaded element.

In general, all forming sections and the corresponding recesses or the respective first and second wall section can preferably be realized in a geometrically identical or uniform manner. However, it is also conceivable to realize forming sections having different geometries and/or recesses having different geometries or first and/or second wall sections having different geometries on a threaded element, either all forming sections and recesses or first and second wall sections being realized according to the invention or only a part of the forming sections or recesses, more precisely the first and second wall sections, being realized according to the invention.

A forming edge of an adjacent forming section preferably adjoins each first wall section in the tightening circumferential direction—in an alternative embodiment, a forming edge of an adjacent forming section does not directly adjoin at least one of the first wall sections, but said forming edge is spaced apart in the circumferential direction.

With respect to the specific realization of the threaded element, different possibilities are available. According to a first alternative, the threaded element is realized as a head screw, comprising a shaft which has or supports the thread realized as an external thread and which extends along the longitudinal center axis and a screw head which projects beyond the shaft in the radial direction and which preferably has a drive realized as an Allen or Torx drive, for example, for applying a torque in the tightening circumferential direction and which has an annular shoulder on the bottom side which faces the shaft, the annular shoulder realizing the annular section together with the anchoring means for the interlocking anchoring in the support section. According to a second alternative, the threaded element is realized as a nut, comprising a nut body having a through opening, the thread being realized as an internal thread on the inner circumference of said through opening and the nut body having the annular section comprising the anchoring means on the front side, alternatively on one side only or in both axial directions opposite to one another, the nut body preferably having a drive, in particular in the form of flat pairs, for applying a torque in the tightening circumferential direction. According to particularly preferred embodiment, the nut and/or head screw are (each) realized in one piece, i.e. in a monolithic manner.

In an advantageous embodiment of the invention, a supporting surface for supporting the annular section on a support section is exclusively realized by the lower forming edges of the forming sections before the forming sections are formed into the support section in order to ensure a maximum surface pressure or force application for the forming of support section material.

With respect to the realization or the dimensioning of the forming sections, different possibilities are available. According to a first alternative, a respective lower forming edge of the forming sections extends at least approximately over the entire radial extension of the annular section. According to an alternative embodiment, the forming edges extend over only a subsection or radial section of the radial extension of the annular section. The latter alternative is in particular used in order to increase the surface pressure by the axial feed of the threaded element when it is screwed to the support section and to be able to form the support section material with comparatively little effort or a comparatively low torque in order to establish the desired interlocking connection. In a particularly preferred embodiment, the forming edges extend in the radial direction over only 5% to 75%, more preferably between 10% and 50%, particularly preferably between 10% and 40%, more preferably between 10% and 25% of the radial extension of the annular section in the radial direction in order to increase the surface pressure. If the threaded element is realized as a head screw, the radial extension of the annular section preferably corresponds to the radial extension of the annular shoulder from the radial inside of the shaft to the transition to the circumferential surface or lateral surface of the screw head. If the threaded element is realized as a screw, the radial extension of the annular section preferably corresponds to the radial extension of an annular axial front side, in particular from the inner circumference of the through bore to the transition to the circumferential or lateral surface of the nut body, i.e. in particular to the transition to facultative flat pairs of the nut.

In order to reduce the radial extension of the annular section and, therefore, of the anchoring means, a corresponding annular extension can preferably be provided on the threaded element, in particular on an axial front side of a nut or on an annular shoulder of a screw head of a head screw.

With respect to the number of the forming sections which are disposed, in particular uniformly distributed, in the circumferential direction, an advantageous compromise between a high holding or braking on the one hand and an easy forming on the other hand provides to select a circumferential angle measured (around the longitudinal central axis) between two forming edges which are directly adjacent in the circumferential direction from a range between 20° and 40°, in particular between 25° and 35° and/or that said circumferential angle is particularly preferably 30°.

In a particularly preferred embodiment, the forming sections are realized in such a manner that at least the largest part, i.e. at least 50% of the support section material located in the corresponding recess after the tightening of the threaded element is exclusively formed, i.e. said support section material is still connected in an integral manner to the remaining support section material outside the recess. In a particularly preferred embodiment, the entire support section material (at least approximately) located inside the recesses is connected to the material of the support section located outside the recesses, i.e. is exclusively formed and not separated from the remaining support section or support section material. In particular, such an embodiment can be realized by the realization according to the invention of the respective second wall section of the recesses in the form of a radius, the recesses thus obtaining a convex shape against the tightening circumferential direction, said convex shape ensuring that material formed into the respective recess can be formed into the concave radius (from the perspective of the recesses) of the second wall section or can slide into said area.

With respect to the dimensioning of the radius, preferably in the form of a circle segment, of the second wall section, said radius is preferably selected from a range between 15% and 60%, in particular between 20% and 50%, particularly preferably between 25% and 40%, more preferably between 28% and 35% of the circumferential distance (circumferential extension) measured in the circumferential direction between two forming edges which are directly adjacent in the circumferential direction and/or of the circumferential extension of the corresponding recess and/or is 33% of the circumferential distance (circumferential extension) measured in the circumferential direction between two forming edges which are directly adjacent in the circumferential direction and/or of the circumferential extension of the corresponding recess.

With respect to the circumferential extension of the second wall section, in particular of the radius, said circumferential extension is preferably selected from a range between 15% and 60%, in particular between 20% and 50%, particularly preferably between 25% and 30%, more preferably between 28% and 35% of the circumferential distance (circumferential extension) measured in the circumferential direction between two forming edges which are directly adjacent in the circumferential direction and/or of the circumferential extension of the corresponding recess and/or is 33% of the circumferential distance (circumferential extension) measured in the circumferential direction between two forming edges which are directly adjacent in the circumferential direction and/or of the circumferential extension of the corresponding recess.

It is particularly useful if the forming sections are hardened, preferably after a cold extrusion process for the realization of the threaded element, in order to be able to deform or form support section material of a support section interacting with the forming sections in an optimum manner into the corresponding recess. In a particularly preferred embodiment, the threaded element is inductively hardened, particularly preferably exclusively in the area of the forming sections, in order to obtain a comparatively thin hardened material layer and, at the same time, to maintain a certain elasticity of the unhardened threaded element material. The threaded element, in particular the forming edges, are particularly preferably hardened (only) to a maximum material depth from a range between 0.2 mm and 2.0 mm, preferably between 0.5 mm and 1.0 mm.

Furthermore, the invention relates to a connection realized as an interlocking connection, the connection comprising a threaded element realized in the aforementioned manner, in particular a head screw or a nut, and a screw joint partner having a mating thread to be screwed to the thread of the threaded element. Additionally, the connection comprises a support section which is either realized by the screw joint partner or by a component which is separate from the screw joint partner and from the threaded element and which is disposed so as to be axially adjacent to the threaded element, wherein the threaded element can be axially displaced towards said component (i.e. in an axial translational displacement direction) by screwing it to the screw joint partner. In particular, such a component can be clamped, preferably between the threaded element and the screw joint partner, by screwing the threaded element to the screw joint partner. After the fixation or after screwing the threaded element to the screw joint partner, the threaded element and the support section engage in an axial manner into one another, i.e. are interlocked by forming support section material axially against the translational displacement direction into the recesses in the annular section of the threaded element. Before the interlocking connection is established, the support section preferably has a plane surface which is assigned to the annular section of the threaded element, the threaded element, more precisely its forming sections, engaging into said surface in the axial direction. As a result, the interlocking connection is characterized in that support section material is formed into the recesses in the annular section of the threaded element (by means of the corresponding forming sections), the support section material being connected in an integral manner to the remaining, i.e. unformed support section material. Preferably the largest part, more preferably all of the support section material located in the recess is exclusively formed (not shorn). The support section material formed into the recesses is supported by the, in particular linear, first wall section in the form of a ramp which limits a respective recess in the tightening circumferential direction, and preferably also by the respective second wall section of the corresponding forming section which is adjacent against the tightening circumferential direction and which is characterized by an entire radius shape (at least section wise) which particularly contributes to the prevention of a shearing because support section material can slide along the radius.

The threaded element is preferably made of a harder material and/or has at least one harder section, in particular produced by means of inductive hardening, compared to the support section to be connected to said section in an integral manner. In particular the threaded element is made of a steel and the support section is made of a light alloy, in particular an aluminum alloy. The threaded element can also be made of a steel which is harder than a steel material of the support section, at least in the area of the forming sections, particularly preferably in the area of the forming edges, wherein the harder realization of the forming sections, in particular of the forming edges can be realized by a subsequent hardening, in particular induction hardening.

By the selection of the first wall sections which limit the recesses in the tightening circumferential direction, in particular at least approximately of the entire wall sections in relation to the radial plane and by the realization of the second wall section in the form of a radius which are opposite against the tightening circumferential direction, the threaded element according to the invention enables the formed support section material to contact the respective first wall sections which are each realized as a ramp and which ascend away from the forming edges in the axial direction, i.e. upwards, in particular over the largest part of the surface extension of said wall sections, particularly preferably over the entire wall or flank and to contact the second wall sections which are opposite against the tightening circumferential direction and which are curved or which have the form of a radius, in particular in such a manner that the connection has practically no clearance in the circumferential direction.

By means of a corresponding realization of the threaded element, the interlocking connection is particularly preferably realized in such a manner that, in order to release the interlocking connection, the threaded element can be actuated against the tightening circumferential direction, in particular by applying a torque to a facultative drive of the threaded element and a breakaway torque can be overcome, the breakaway torque being greater than a release element required for releasing a corresponding connection to a threaded element which has the same dimensions and which does not have the forming sections according to the invention and the recesses including the angle selection of the first wall sections and the second wall sections which have the form of a radius and/or have a radius, but said threaded element rather has a plane, in particular radially plane, annular section for contacting the support section.

In a particularly preferred embodiment, the interlocking connection is realized in such a manner that, in order to release the interlocking connection, the threaded element can be actuated against the tightening circumferential direction and the support section material which is formed into the recesses can be shorn. In other words, the threaded element is preferably realized in such a manner that, during the tightening, the formed support section material is compulsorily shorn during the release.

BRIEF DESCRIPTION OF THE DRAWINGS

Further advantages, features and details of the invention can be derived from the following description of preferred exemplary embodiments and from the drawings.

In the following.

DETAILED DESCRIPTION

In the figures, the same elements and elements having the same function are referenced with the same reference numerals. The dimensions indicated in the figures are solely used for explanatory purposes and do not limit the invention—however, the dimensions and any dimension ratio which is based on at least two dimensions are seen disclosed features relating to the invention and are thus also claimable therefor.

Figure 1A:
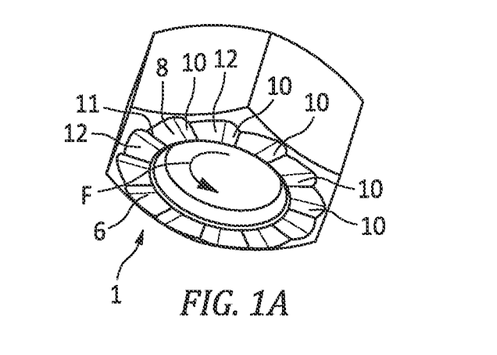
FIG. 1a to FIG. 1c are different, partially sectional views of a preferred embodiment of the threaded element realized according to the idea of the invention, in the present case realized as a nut.
Figure 1B:
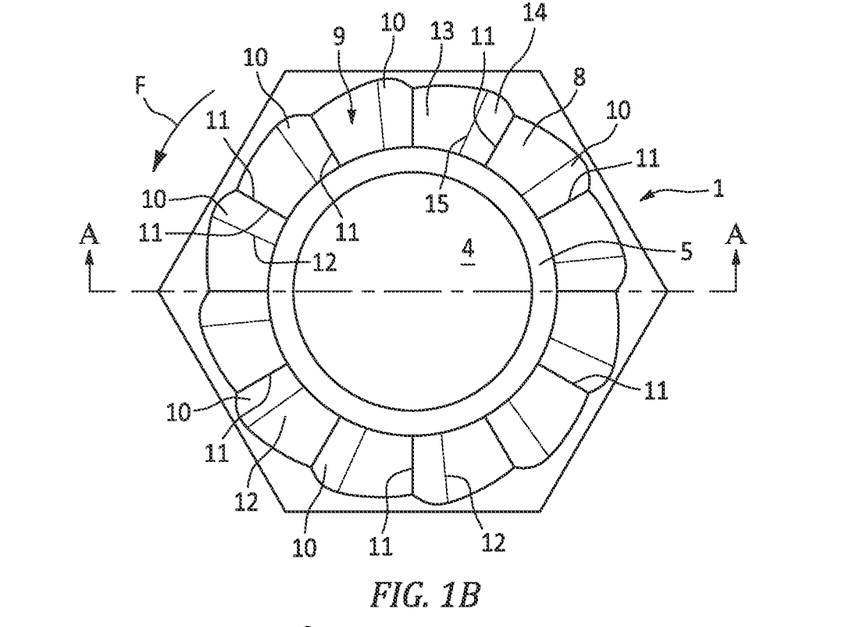
Figure 1C:
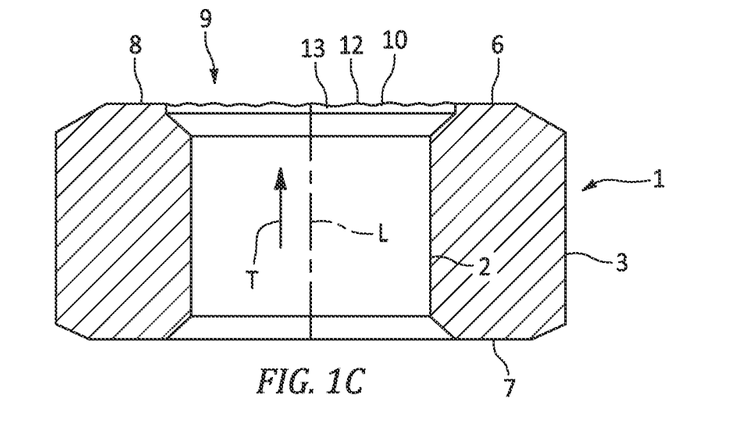

In FIGS. 1a to 1c, a threaded element 1 realized as a cold extrusion part made of metal, in the present case steel, is exemplarily shown in the form of a nut. Said nut comprises a monolithic nut body which has a drive 3 on the lateral side, in the present case in the form of flat pairs which have a wrench size SW19, for example. In nut body 2, a through opening 4 is provided, a thread 5 realized as an internal thread, in the present case as a metric M12 thread, limiting through opening 4 on the outside.

Nut body 2 has a longitudinal center axis L, two axial front sides 6, 7 being axially spaced apart from one another along longitudinal center axis L. Exemplarily upper front side 6 in the drawing layer according to FIG. 1c realizes an annular section 8 on which anchoring means 9 are realized in a monolithic manner with nut body 2. By rotating threaded element 1 around longitudinal center axis L in a tightening circumferential direction F and therefore screwing threaded element 1 to a screw joint partner having a mating thread corresponding to thread 5, threaded element 1 is axially displaced or displaced in a translational, axial displacement direction T, in the example of FIG. 1b in a perpendicular manner from the drawing layer or upwards in the drawing layer in the representation according to FIG. 1c. By means of the combined rotation and axial displacement movement, anchoring means 9 are formed into a support section, an interlocking connection thus being established between threaded element 1 and the support section.

In the shown exemplary embodiment, anchoring means 9 comprise several forming sections 10, in the present case uniformly spaced apart in the circumferential direction, in order to establish an interlocking connection or anchoring in the support section, each forming section 10 having an axially lower forming edge 11 or a forming edge 11 located in axial displacement direction T and extending in the radial direction.

An axial recess 12 is disposed adjacent to each forming section 10 in the tightening circumferential direction, wherein said recess 12 extends upwards or away from anchoring means 9, i.e. against axial displacement direction T and wherein support section material can be formed or displaced into recess 12 by means of corresponding forming section 10 when threaded element 1 is rotated in tightening circumferential direction F in order to complicate a release of threaded element 1 against tightening circumferential direction F.

In tightening circumferential direction F, each recess 12 is limited by a first wall section 13 in the form of a ramp which extends axially away from the forming edges or from the support section against the tightening circumferential direction. Against the tightening circumferential direction, each recess 12 is limited by a second wall section 14 in the form of a radius, first and second wall section 13, 14 meeting one another at a radial line 15 or at the lowest point of the respective recess in the axial direction. In the shown exemplary embodiment, second wall sections 14 are realized with a radius R3.

As shown in FIG. 1b, two forming edges 11 which are directly adjacent in the circumferential direction are spaced apart from one another by an angle of 30°—in other words, the circumferential extension angle of recesses 12 is 30°.

Additionally, FIGS. 1a to 1c show that, before forming sections 10 are formed into the support section, a surface which protrudes furthest in the axial direction, i.e. a support surface for supporting annular section 6 on the support section is exclusively realized by the lower forming edges of forming sections 10.

Figure 2A:
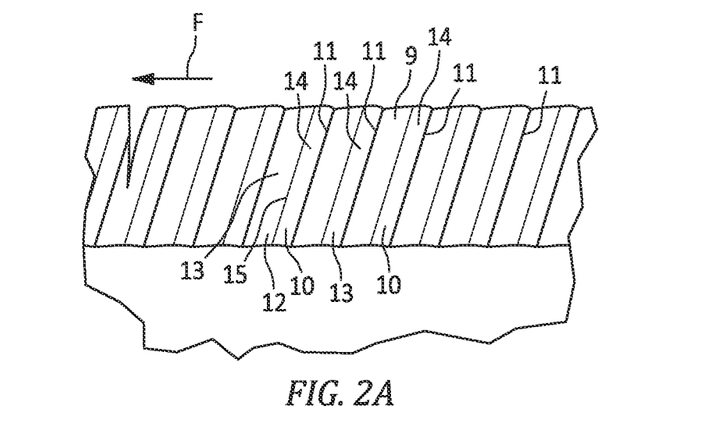
FIG. 2a is an implementation of an annular section of a threaded element realized according to the idea of the invention, the annular section comprising anchoring means.

In FIG. 2a, an implementation of anchoring means 9 according to the invention is shown. Said figure shows forming edges 11 which are spaced apart in the circumferential direction and which limit corresponding forming sections 10 in axial displacement direction T, i.e. towards the support section. Furthermore, the figure shows second wall sections 14 of forming sections 10 in the form of a radius, recesses 12 realized between two forming edges 11 being extended or curved in a convex manner against tightening circumferential direction F by the radius. In the shown exemplary embodiment, second wall sections 14 are entirely realized in the form of a radius, the radius thus extending from a respective forming edge 11 to the respective lowest point in the axial direction or each recess 12 or to respective radial line 15. At this point, respective second wall section 14 meets first wall section 13 which is opposite in tightening circumferential direction F and which has a pitch angle δ which is larger than the thread pitch angle of thread 5 by at least 0.5° and not more than 20°. Said angle position results from FIGS. 2b and 2c which show sections of a connection 16 of threaded element 1 and a support section 17, anchoring means 9 of threaded element 1 being axially formed into support section 17.

Figure 2B:
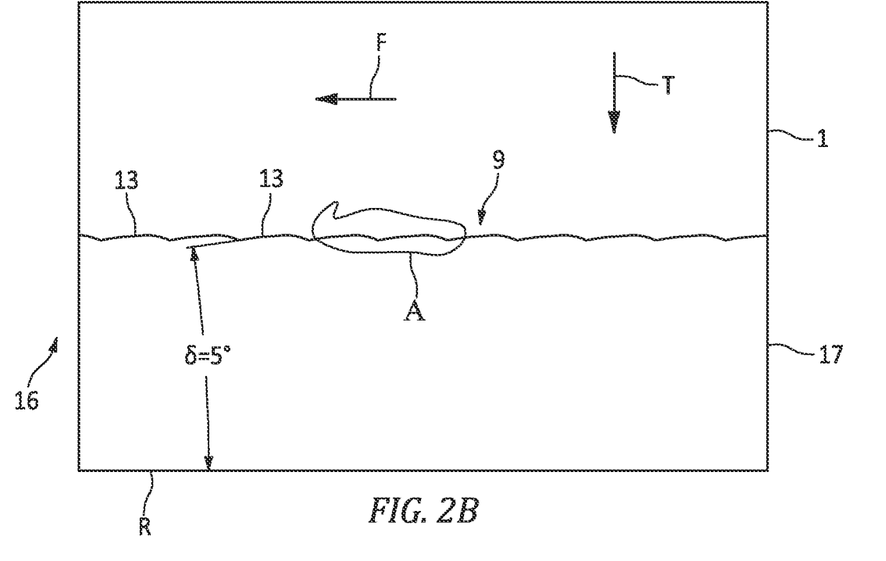
FIG. 2b and FIG. 2c are implementations of an interlocking connection established by means of a threaded element according to the invention.

In FIG. 2b, pitch angle δ of one first wall section 13 or of first wall sections 13 is marked. Said angle δ is spanned by respective first wall section 13 and a radial plane R. The thread pitch angle of a M12 thread, which is provided in an exemplary manner, is 2.94°, pitch angle δ at a value of 5° in the present case thus being larger than thread pitch angle α of thread 5 by an angle of 2.06°.

Figure 2C:
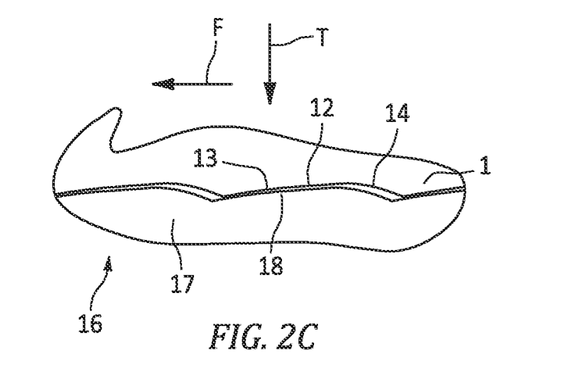

The enlarged view according to FIG. 2c shows the radius shape of second wall sections 14 and the respective circumferential extension of recesses 12. In the shown exemplary embodiment, the circumferential extension of respective second wall section 14 corresponds to 50% of the circumferential extension of corresponding first wall section 13 to a third of the circumferential extension of recess 12.

It can be seen that support section material 18 clings to first wall section 13 and to second wall section 14 when the interlocking connection is established—the curved or arc-shaped form (due to the radius) of second wall section 14 is reflected in formed support section material 18 in a congruent manner with respect to the form, support section material 18 being or remaining connected to the remaining material of support section 17 in an integral manner.

As shown in the representation according to FIG. 2c, support section material 18 contacts first wall sections 13 of threaded element 1 over a large area when threaded element 1 is rotated against tightening circumferential direction F, said fact resulting in a significant increase of the release torque—a turning is not easily possible because, as previously mentioned, the pitch angle of the thread is smaller.

Alternative exemplary embodiments of threaded elements 1 realized according to the idea of the invention are described below—in order to avoid repetitions, the descriptions focus on the differences with respect to the aforementioned exemplary embodiments. With respect to the communalities and to the connections which can be established by means of such a threaded element, reference is made to the aforementioned description of the figures and the corresponding figures.

Figure 3A:
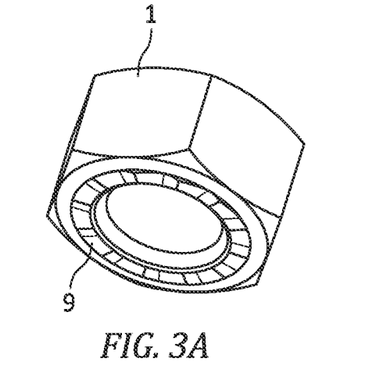
FIG. 3a to FIG. 3c show an alternative exemplary embodiment o a threaded element realized according to the idea of the invention and realized as a nut, the alternative embodiment having a narrower annular section in the radial direction compared to the exemplary embodiment according to FIGS. 1a to 1c, FIG. 4a to FIG. 4c show an additional alternative exemplary embodiment of the threaded element realized according to the idea of the invention in the form of a nut.
Figure 3B:
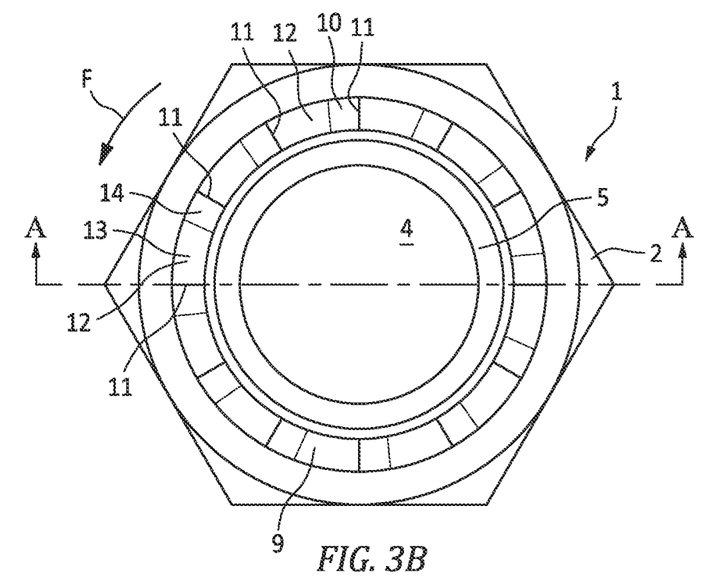
Figure 3C:
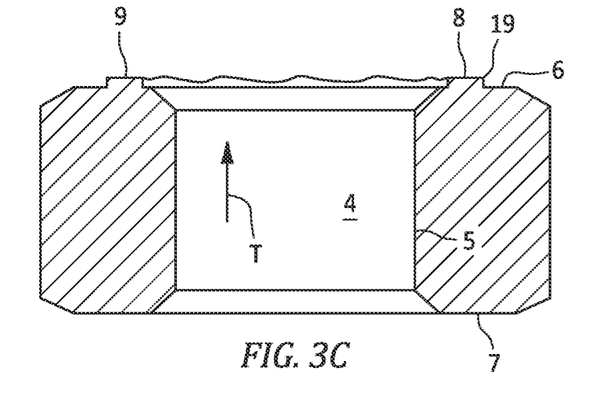

The exemplary embodiment according to FIGS. 3a to 3c shows that annular section 8 has a smaller radial extension, the surface pressure thus being increased when anchoring means 9 are formed into annular section 8. To this end, an annular extension 19 (step) which realizes annular section 8 is provided on front side 6.

Figure 4A:
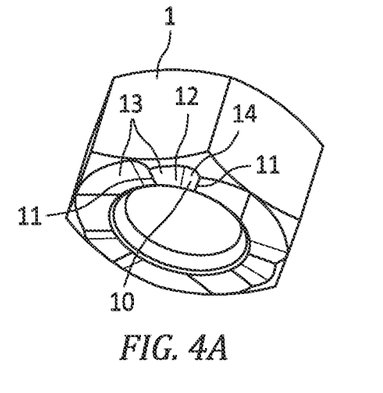
Figure 4B:
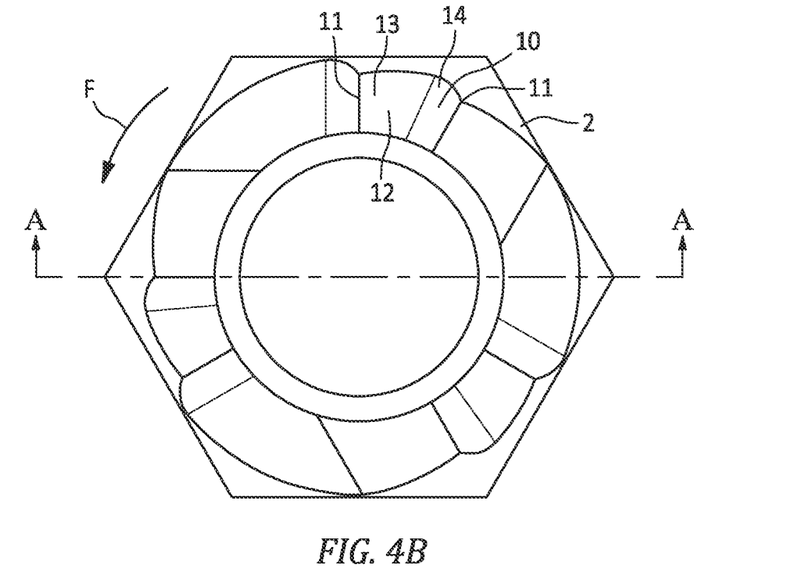
Figure 4C:
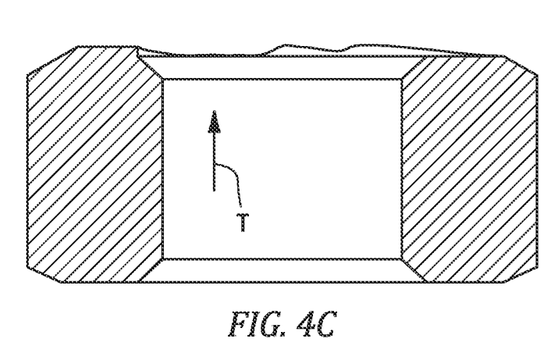

In the exemplary embodiment according to FIG. 4a, significantly less forming sections 10 (in fact three of them) and corresponding forming edges 11 are provided in order to reduce the tightening torque.

Figure 5A:
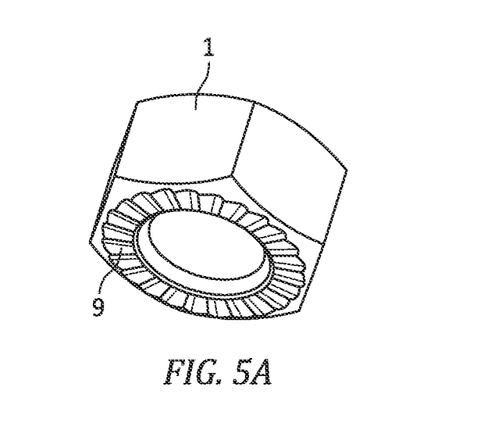
FIG. 5a to FIG. 5c show an additional alternative exemplary embodiment of the threaded element realized according to the idea of the invention, in an exemplary manner also in the form of a nut, and having more forming sections and edges compared to the exemplary embodiment according to FIG. 1a to FIG. 1c.
Figure 5B:
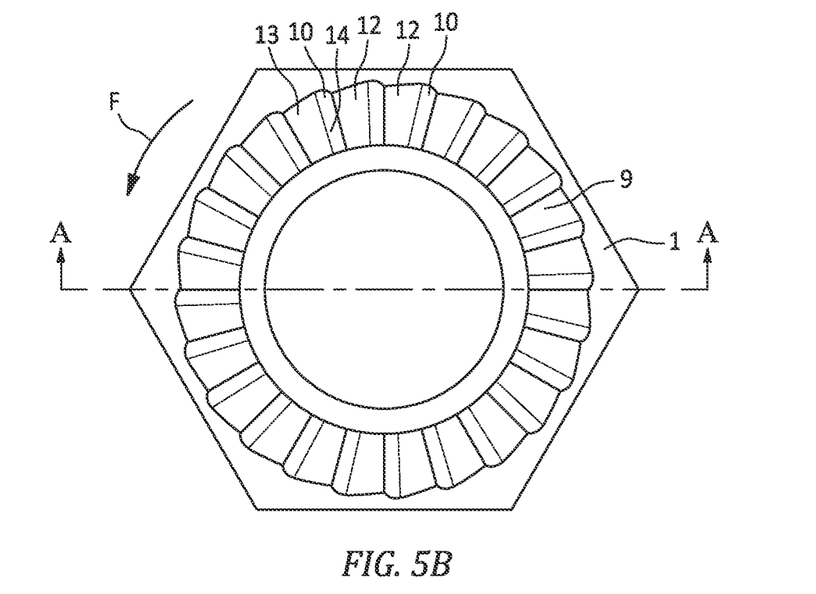
Figure 5C:
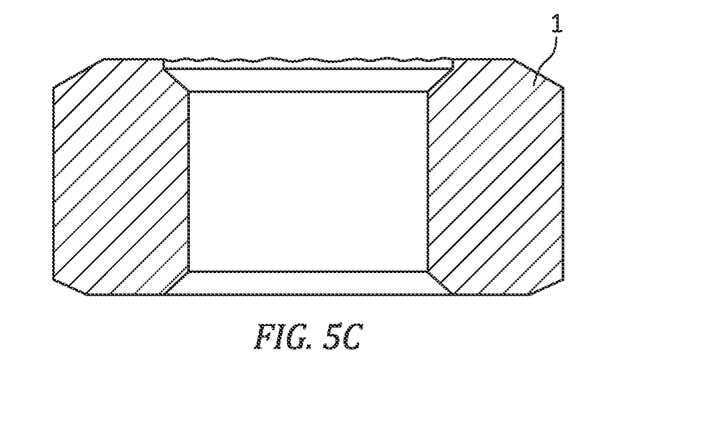

In the exemplary embodiment according to FIGS. 5a to 5c, the circumferential extension of recesses 12 is smaller than the extension in the exemplary embodiment according to FIGS. 1a to 1c, more forming sections 10 thus being disposed in the same area.

Figure 6:
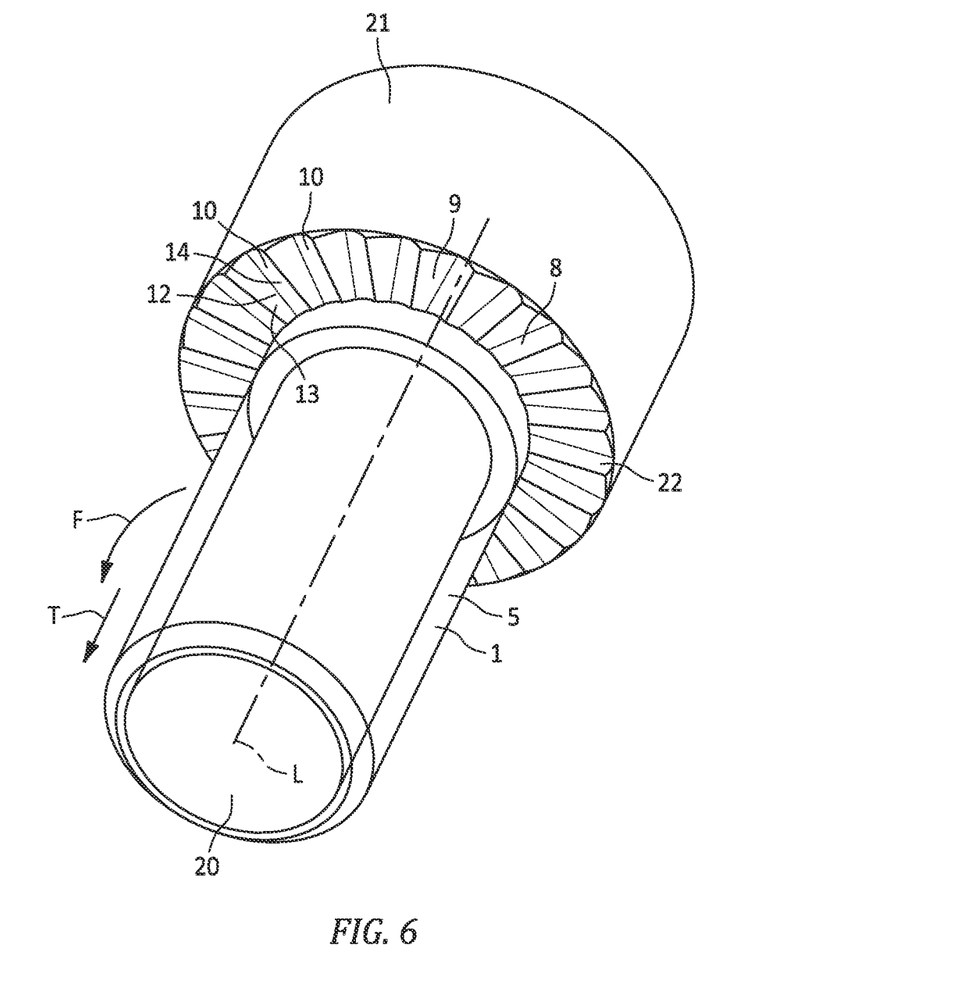
FIG. 6 is a perspective view of an alternative threaded element realized according to the idea of the invention, in the present case realized as a head screw.

The exemplary embodiment according to FIG. 6 shows a threaded element realized as a head screw which comprises a shaft 20 which extends along longitudinal center axis L and which supports a thread 5 realized as an external thread. A screw head 21 protrudes radially beyond shaft 20 and thread 5, said screw head 21 having a lower annular shoulder 22 facing shaft 20—in the present case, annular shoulder 22 realizes annular section 8 and its anchoring means 9 over the entire radial extension (in an alternative manner over a portion of the radial extension). In the shown exemplary embodiment, anchoring means 9 are realized by analogy with the exemplary embodiment according to FIGS. 5a to 5c and comprise a plurality of the circumferential directions, in the present example forming sections 10 which are disposed so as to be uniformly distributed and which support a second wall section 14 in the form of a radius, second wall section 14 limiting a corresponding recess 12 against the tightening circumferential direction. In tightening circumferential direction F, each recess 12 is limited by a first wall section 13 in the form of a ramp, a pitch angle of first wall section 13 being larger than the thread pitch angle of thread 5 realized as an external thread by at least 0.5°. On the front side (not visible in the view according to FIG. 6), screw head 21 of the head screw has a drive recess.

REFERENCE SIGNS 1 threaded element
2 nut body
3 drive
4 through opening
5 thread
6 front side having an annular section
7 front side
8 annular section
9 anchoring means
10 forming section
11 forming edges
12 recess
13 first wall sections
14 second wall sections
15 radial line
16 connection
17 support section
18 support section material
19 annular extension
20 shaft
21 screw head
22 annular shoulder
L longitudinal central axis
T axial (translational) displacement direction of the threaded element by rotation in the tightening circumferential direction
F tightening circumferential direction
R radial plane
δ pitch angle of the first wall sections

The invention claimed is:

1. A threaded element (1), having a longitudinal center axis (L) and comprising a thread (5) having a thread pitch angle, wherein the threaded element (1) can be screwed to a screw joint partner having a mating thread by rotation in a tightening circumferential direction (F) and can thereby be displaced in an axial displacement direction (T) oriented along the longitudinal center axis (L) onto a support section (17) of the screw joint partner or a separate component, and the threaded element (1) having an annular section (8) for the support on the support section (17), and anchoring means (9) for the interlocking anchoring in the support section (17) being realized on the annular section (8) in order to establish an interlocking connection, the anchoring means (9) having several forming sections (10) which are spaced apart in the tightening circumferential direction (F), each forming section (10) comprising a lower forming edge (11) extending in the axial displacement direction (T), a recess (12) being disposed upstream of each forming section (10) in the tightening circumferential direction (F) in order to receive support section material (18) formed by means of the corresponding forming section (10), the recesses (12) being limited by a wall on a circumferential side opposite to the corresponding forming section (10) in the tightening circumferential direction (F), the wall having a first wall section (13) realized as a ramp and ascending against the tightening circumferential direction (F) upwards against the axial displacement direction (T) or being composed thereof and each recess (12) being limited by a second wall section (14) of the respective forming section (10), on the circumferential side opposite to the first wall section (13) realized as a ramp against the tightening circumferential direction (F),
wherein
the first wall sections (13) realized as ramps opposite to the forming sections (10) in the tightening circumferential direction (F) each have a pitch angle (δ) in relation to a radial plane (R) through which the longitudinal center axis (L) passes in the perpendicular direction, the pitch angle (δ) being larger than the thread pitch angle of the thread (5) by an angle between at least 0.5° and not more than 20°, and wherein the second wall sections (14) comprise a radius or are realized as a radius, and
wherein the threaded element (1) is, exclusively partially hardened in such a manner that the forming edges (11) are inductively hardened and/or wherein the forming edges (11) are hardened to a maximum material depth from a range between 0.2 mm and 2.0 mm.

2. The threaded element according to claim 1, wherein said threaded element is realized as a head screw, comprising a shaft (20) which has the thread (5) realized as an external thread and which extends along the longitudinal center axis (L) of the head screw and a screw head (21) which projects beyond the shaft (20) in the radial direction and which has a drive (3) for applying a torque in the tightening circumferential direction (F) and which has an annular shoulder (22) on the bottom side which faces the shaft (20), the annular shoulder (22) realizing the annular section (8) together with the anchoring means (9) for the interlocking anchoring in the support section (17), or wherein the threaded element (1) is realized as a nut, comprising a nut body (2) having a through opening (4), the thread (5) being realized as an internal thread on the inner circumference of said through opening (4) and the nut body (2) having the annular section (8) comprising the anchoring means (9) on the front side, the nut body (2) having a drive (3), in the form of flat pairs, for applying a torque in the tightening circumferential direction (F).

3. The threaded element according to claim 1, wherein a support surface for supporting the annular section (8) on a support section (17) is exclusively realized by the lower forming edges (11) of the forming sections (10) before the forming sections (10) are formed into the support section (17).

4. The threaded element according to claim 1, wherein the lower forming edges (11) extend over the entire radial extension of the annular section in the radial direction or over a subsection of the radial extension of the annular section (8).

5. The threaded element according to claim 4, wherein the subsection is from a range between 5% and 50% of the radial extension.

6. The threaded element according to claim 1, wherein a circumferential angle between two forming edges (11) which are directly adjacent in the circumferential direction is selected from a range between 20° and 40°.

7. The threaded element according to claim 1, wherein the forming sections (10) are at least largely realized so as to form, not machine, support section material (18).

8. The threaded element according to claim 7, wherein the forming sections are exclusively realized so as to form, not machine, support section material (18).

9. The threaded element according to claim 1, wherein the radius of the second wall section (14) is selected from a range between 15% and 60%, of the circumferential distance measured in the circumferential direction between two forming edges (11) which are directly adjacent in the circumferential direction and/or of the circumferential extension of the corresponding recess (12) and/or is 33% of the circumferential distance measured in the circumferential direction between two forming edges (11) which are directly adjacent in the circumferential direction and/or of the circumferential extension of the corresponding recess (12).

10. The threaded element according to claim 1, wherein a circumferential extension of the second wall section (14) is selected from a range between 15% and 60% of the distance measured in the circumferential direction between two forming edges (11) which are directly adjacent in the circumferential direction and/or of the circumferential extension of the corresponding recess (12) and/or is 33% of the circumferential distance measured in the circumferential direction between two forming edges (11) which are directly adjacent in the circumferential direction and/or of the circumferential extension of the corresponding recess (12).

11. A connection, comprising a threaded element (1) according to claim 1 and a screw joint partner, the thread (5) of the threaded element (1) being screwed to a mating thread of the screw joint partner and material of the support section (17) of the screw joint partner or of a component clamped in the axial direction between the screw joint partner and the threaded element (1) being formed into the recesses (12) in order to establish an interlocking connection, the formed material being connected to the unformed material of the support section (17) in an integral manner.

12. The connection according to claim 11, wherein the forming sections (10) of the threaded element (1) are made of a material which is harder than the formed material of the support section (17) which is formed into the at least one recess (12).

13. The connection according to claim 11, wherein the formed material contacts the respective wall section (13, 14) which is realized as a ramp over the largest part of the surface extension of said wall section (13, 14), and contacts the radius of the corresponding second wall section (14) of the respective recess (12).

14. The connection according to claim 11, wherein the interlocking connection is realized in such a manner that, in order to release the interlocking connection, the threaded element (1) can be actuated against the tightening circumferential direction (F) and a breakaway torque can be overcome, the breakaway torque being higher than a release torque of a corresponding connection (16) in which an otherwise identical threaded element (1) has no forming sections (10).

15. The connection according to claim 11, wherein the interlocking connection is realized in such a manner that, in order to release the interlocking connection, the threaded element (1) can be rotated against the tightening circumferential direction (F) and the component material which is formed into the recess (12) can be shorn.

16. The threaded element according to claim 1, wherein the threaded element is realized as a cold extrusion part made of metal.

17. The threaded element according to claim 1, wherein the forming sections (10) are disposed so as to be uniformly distributed in the circumferential direction.

18. The threaded element according to claim 1, wherein the respective forming section (10) adjoins the forming edge (11) and/or the first wall section (13).

19. The threaded element according to claim 1, wherein the first wall sections (13) are realized as linear ramps opposite to the forming sections (10).

* * * * *